(12) United States Patent
Shalom

(10) Patent No.: US 6,876,669 B2
(45) Date of Patent: Apr. 5, 2005

(54) PACKET FRAGMENTATION WITH NESTED INTERRUPTIONS

(75) Inventor: Rafi Shalom, Ramat Gan (IL)

(73) Assignee: Corrigent Systems Ltd., Tel Aviv (IL)

( * ) Notice: Subject to any disclaimer, the term of this patent is extended or adjusted under 35 U.S.C. 154(b) by 794 days.

(21) Appl. No.: 09/756,553

(22) Filed: Jan. 8, 2001

(65) Prior Publication Data

US 2002/0131425 A1 Sep. 19, 2002

(51) Int. Cl.$^7$ .................................................. H04J 3/16
(52) U.S. Cl. ...................... 370/468; 370/473; 370/474
(58) Field of Search ............................... 370/352, 433, 370/434, 435, 465, 466, 468, 394, 473, 474

(56) References Cited

U.S. PATENT DOCUMENTS

| | | | |
|---|---|---|---|
| 5,173,898 A | | 12/1992 | Heinzmann et al. |
| 5,343,473 A | * | 8/1994 | Cidon et al. ............... 370/465 |
| 5,497,371 A | * | 3/1996 | Ellis et al. .................. 370/412 |
| 5,557,608 A | * | 9/1996 | Calvignac et al. .......... 370/389 |
| 5,734,867 A | * | 3/1998 | Clanton et al. ............. 370/461 |
| 5,742,592 A | * | 4/1998 | Scholefield et al. ........ 370/329 |
| 5,999,565 A | | 12/1999 | Locklear, Jr. et al. |
| 6,026,093 A | | 2/2000 | Bellaton et al. |
| 6,212,190 B1 | | 4/2001 | Mulligan |
| 6,366,589 B1 | | 4/2002 | Naudus, Jr. et al. |
| 6,553,003 B1 | | 4/2003 | Chang |
| 6,594,249 B1 | * | 7/2003 | Goldberg .................... 370/345 |
| 6,594,278 B1 | * | 7/2003 | Baroudi ...................... 370/466 |
| 6,631,132 B1 | * | 10/2003 | Sourani ...................... 370/389 |
| 6,633,564 B1 | * | 10/2003 | Steer et al. ................. 370/389 |
| 6,654,811 B1 | | 11/2003 | Chaskar et al. |
| 2002/0041595 A1 | * | 4/2002 | Delvaux ..................... 370/392 |
| 2003/0103515 A1 | | 6/2003 | Brown et al. |

OTHER PUBLICATIONS

The ATM Forum Technical Committee, "Inverse Multiplexing for ATM (IMA) Specification, Version 1.0", AF–PHY–0086.000, Jul. 1997, pp. 1–135.

Sklower, K. et al., RFC 1990, "The PPP Multilink Protocol (MP)", pp. 1–25, Aug. 1996.

* cited by examiner

Primary Examiner—Chau Nguyen
Assistant Examiner—Christine Ng
(74) Attorney, Agent, or Firm—Darby & Darby

(57) ABSTRACT

A method for transmitting data over a channel includes receiving a first datagram for transmission at a first priority, and receiving a second datagram for transmission at a second priority, higher than the first priority, before the transmission of the first datagram is completed. The first datagram is divided into a plurality of fragments, including a first fragment and a last fragment. The fragments of the first datagram are transmitted over the channel, beginning with the first fragment. At least a fragment of the second datagram is transmitted over the channel before transmitting the last fragment of the first datagram.

27 Claims, 3 Drawing Sheets

PACKET FRAGMENTATION WITH NESTED INTERRUPTIONS

FIELD OF THE INVENTION

The present invention relates generally to high-speed data transmission, and specifically to methods and systems for multiplexing of data streams with different priorities over a single channel.

BACKGROUND OF THE INVENTION

A number of methods are known in the art for aggregating multiple physical links into a single logical channel between a transmitter and a receiver. Data are split at the transmitter into multiple streams, each of which is transmitted over a respective one of the physical links. The receiver then reassembles the data into the original order. The use of multiple parallel links is advantageous in providing high channel bandwidth when only low-bandwidth links are available, and also assists network operators in offering flexible data rates and bandwidth on demand.

Standard methods for multilink transmission of this sort have been defined for both Asynchronous Transfer Mode (ATM) and Internet Protocol (IP) networks. The ATM approach is described in document AF-PHY-0086.001, promulgated by the ATM Forum (1999), entitled "Inverse Multiplexing for ATM (IMA) Specification Version 1.1." For IP networks, the "PPP Multilink Protocol" is described by Sklower et al. in Request for Comments (RFC) 1990 of the Internet Engineering Task Force (IETF). Both of these documents are incorporated herein by reference.

FIG. 1 is a block diagram that schematically illustrates a system 20 for multilink data communications in accordance with the PPP Multilink Protocol, as is known in the art. A transmitter 22 transmits data over a multilink channel 24 to a receiver 26. Channel 24 comprises multiple physical links 28, 30, 32. A fragmenter 40 breaks incoming packets 34, 36, 38 into fragments 42 for transmission over the different physical links. Each fragment 42 receives a Multilink Protocol (MP) header that includes a fragment sequence number (SN), a beginning bit (B) and an ending bit (E). The SN is incremented for each fragment in the sequence. In the example shown in FIG. 1, SN runs from 4 to 13. Packet 34 is divided into fragments 4–7, packet 36 into fragments 8–10, and packet 38 into fragments 11–13. The first fragment in each packet receives B=1, while the last segment receives E=1. Otherwise, B and E are set to zero. When a fragment contains an entire packet, both B and E are set to 1.

Transmitter 22 sends fragments 42 over channel 24 in the order of their sequence numbers. There is no assurance, however, that the fragments will arrive in order at receiver 26, and some of the fragments may be lost entirely. A reassembler 44 in receiver 26 waits until all of the fragments in a given packet have arrived before rebuilding the entire packet. (Although for the sake of conceptual clarity, fragmenter 40 and reassembler 44 are shown and described herein as distinct functional blocks, the functions of these blocks are typically carried out along with other functions by central processing units (CPUs) in transmitter 22 and receiver 26, respectively.) If reassembler 44 determines that any of the fragments in the packet have been lost, the rest of the fragments in the packet are discarded.

In order to detect lost fragments, reassembler 44 keeps track of the minimum over all of links 28, 30 and 32 of the most recently received SN. This minimum is identified in FIG. 1 as M, which is seen to increase from 4 to 5 to 6 to 9 as fragments 42 arrive in sequence over the links. Whenever an ending (E) fragment arrives, the reassembler checks the SN of the ending fragment against M. When M is greater than the SN of the ending fragment ($SN_E$), and the remaining fragments in the packet to which the ending fragment belongs have not yet arrived, the missing fragments are considered to have been lost. All of the fragments whose sequence numbers are less than or equal to $SN_E$ are then discarded. For example, if in the scheme shown in FIG. 1, the fragment with SN=5 had failed to arrive at the receiver, then when M=9, the ending fragment of packet 34 ($SN_E$=7), which was previously received, would meet the criterion M>$SN_E$. All of the fragments belonging to packet 34 (SN=4, 6 and 7) would then be discarded.

In order for this method of reassembly and lost fragment detection to work properly, it is necessary that transmitter 22 send the fragments strictly in order of their sequence numbers. All of the fragments of each packet must therefore be sent without interruption before the transmitter begins sending the fragments of the next packet. As a result, when the ending fragment is received, the receiver is assured that all of the fragments in the packet have already been transmitted. If M increases past $SN_E$ without all of the fragments in the packet having arrived, then it can be safely assumed that one or more of the packets have been lost.

SUMMARY OF THE INVENTION

It is an object of the present invention to provide improved methods and systems for datagram fragmentation and reassembly, particularly for multilink data transmission.

It is a further object of some aspects of the present invention to provide enhanced support for fragmentation and transmission of datagrams at multiple priority levels.

In preferred embodiments of the present invention, a data transmitter and receiver exchange datagrams, typically data packets, over a channel at multiple priority levels. The transmitter determines during transmission whether each of the packets should be divided into fragments for transmission to the receiver, depending on packet traffic and priorities and other system conditions. The receiver then reassembles the packets as necessary, based on information contained in the fragment headers. The decision as to whether a packet should be fragmented and in what manner is preferably made by the transmitter "on the fly." By contrast, prior art transmitters work with fixed fragment sizes and require that the decision to fragment or not to fragment the packets be made statically, before beginning operation.

In particular, when the transmitter receives a high-priority packet for transmission while in the midst of transmitting a lower-priority packet, the lower-priority packet is preferably fragmented. The transmission of the fragments of the lower-priority packet is interrupted in order to send the high-priority packet fragments immediately. As a result, the order of transmission of the packet fragments need not follow the order in which the packets were received by the transmitter. Transmission of the fragments of the lower-priority packet is typically completed after the high-priority packet has been sent. Priority information in the fragment headers enables the receiver to identify interruptions, so as to reassemble the packets and detect lost fragments even when the fragments are not transmitted in the order of the original packet sequence.

Preferred embodiments of the present invention are particularly advantageous in multilink transmission settings.

Use of the present invention enables delay-sensitive services, such as voice, to be transmitted with minimal delay over multilink channels that are also used to provide high-volume, delay-insensitive services, such as Web browsing and electronic mail. As noted above, the PPP Multilink protocol, like other datagram fragmentation methods known in the art, requires that fragments be transmitted in packet order. Under such conventional methods, once the transmitter has begun sending fragments of a given packet, it cannot stop until the entire packet has been sent. Thus, the only way that a high-priority packet can be assured immediate transmission is by discarding any low-priority packets whose transmission is in progress. The multi-priority approach of the present invention, however, allows the transmitter to stop sending the low-priority packet in the middle, and then to complete the transmission after high-priority requirements have been serviced. This added responsiveness to high-priority requirements is especially important in the presence of low-speed channels and long, low-priority packets.

In some preferred embodiments of the present invention, three or more priority levels are defined. Transmission of packet fragments at a given level can be interrupted, as described above, by another packet at any higher level. "Nested" packet interruptions are also supported, whereby a low-priority packet is interrupted by a medium-priority packet, which is in turn interrupted by a high-priority packet, following which all of the transmissions are completed. Substantially any number of such nested priorities can be supported without compromising the ability of the receiver to reassemble all of the packets.

There is therefore provided, in accordance with a preferred embodiment of the present invention, a method for transmitting data over a channel, including:

receiving a first datagram for transmission at a first priority;

receiving a second datagram for transmission at a second priority, higher than the first priority, before the transmission of the first datagram is completed;

dividing the first datagram into a plurality of fragments, including a first fragment and a last fragment;

transmitting the fragments of the first datagram over the channel, beginning with the first fragment; and transmitting at least a fragment of the second datagram over the channel before transmitting the last fragment of the first datagram.

In a preferred embodiment, receiving the first and second datagrams includes receiving Internet Protocol (IP) packets, and transmitting the fragments includes distributing the fragments for transmission over a plurality of parallel physical links, wherein the plurality of parallel physical links are arranged so as to constitute a single logical channel. Preferably, the fragments of the first and second datagrams are received and reassembled at a receiver connected to the plurality of parallel physical links. Further preferably, transmitting the fragments includes adding an indication to the fragments that transmission of the fragments of the first datagram was interrupted by transmission of the second datagram, and reassembling the datagrams includes reassembling the packets responsive to the indication. Most preferably, reassembling the datagrams includes detecting loss of a fragment of one of the datagrams on one of the links, and discarding other fragments received at the receiver responsive to the indication.

Typically, transmitting at least the fragment of the second datagram includes dividing the second datagram into multiple fragments for transmission over the channel.

Preferably, transmitting at least the fragment of the second datagram includes interrupting transmission of the fragments of the first datagram until all fragments of the second datagram have been transmitted over the channel. Alternatively, transmitting at least the fragment of the second datagram includes interspersing transmission of the fragments of the first datagram with one or more fragments of the second datagram, subject to the first and second priorities.

In a preferred embodiment, the multiple fragments of the second diagram include first and last fragments, and the method includes receiving a third datagram for transmission at a third priority, higher than the second priority, before the last fragment of the second datagram has been transmitted, and transmitting at least a fragment of the third datagram over the channel before transmitting the last fragment of the second datagram. Preferably, transmitting the at least one fragment of the third datagram includes transmitting the at least one fragment of the third datagram before transmitting the last fragment of the first datagram.

Preferably, transmitting at least the fragment includes interrupting transmission of a number of datagrams, including at least the first datagram, in order to transmit at least the fragment of the second datagram, and adding a field to the fragment indicating the number of datagrams whose transmission has been interrupted. Further preferably, the method includes receiving the fragments of the first and second datagrams at a receiver connected to the channel, and reassembling the datagrams from the fragments responsive to the field indicating the number. Most preferably, reassembling the datagrams includes detecting loss of a fragment having a given value of the number indicated by the field, and discarding other fragments received at the receiver with the given value of the number indicated by the field.

Preferably, dividing the first datagram into the plurality of fragments including deciding on division of the first datagram into the plurality of fragments responsive to receiving the second datagram.

There is also provided, in accordance with a preferred embodiment of the present invention, apparatus for transmitting data over a channel, including:

a transmitter, coupled to receive first and second datagrams for transmission over the channel at respective first and second priorities, wherein the second priority is higher than the first priority, and the transmitter receives the second packet before the transmission of the first packet is completed, and adapted to divide the first datagram into a plurality of fragments, including a first fragment and a last fragment, and to transmit the fragments of the first datagram over the channel, beginning with the first fragment, and to transmit at least a fragment of the second datagram over the channel before transmitting the last fragment of the first datagram; and a receiver, adapted to receive the fragments of the datagrams over the channel and to reassemble the fragments so as to reconstruct the first and second datagrams.

The present invention will be more fully understood from the following detailed description of the preferred embodiments thereof, taken together with the drawings in which:

DETAILED DESCRIPTION OF PREFERRED EMBODIMENTS

Figure 1:
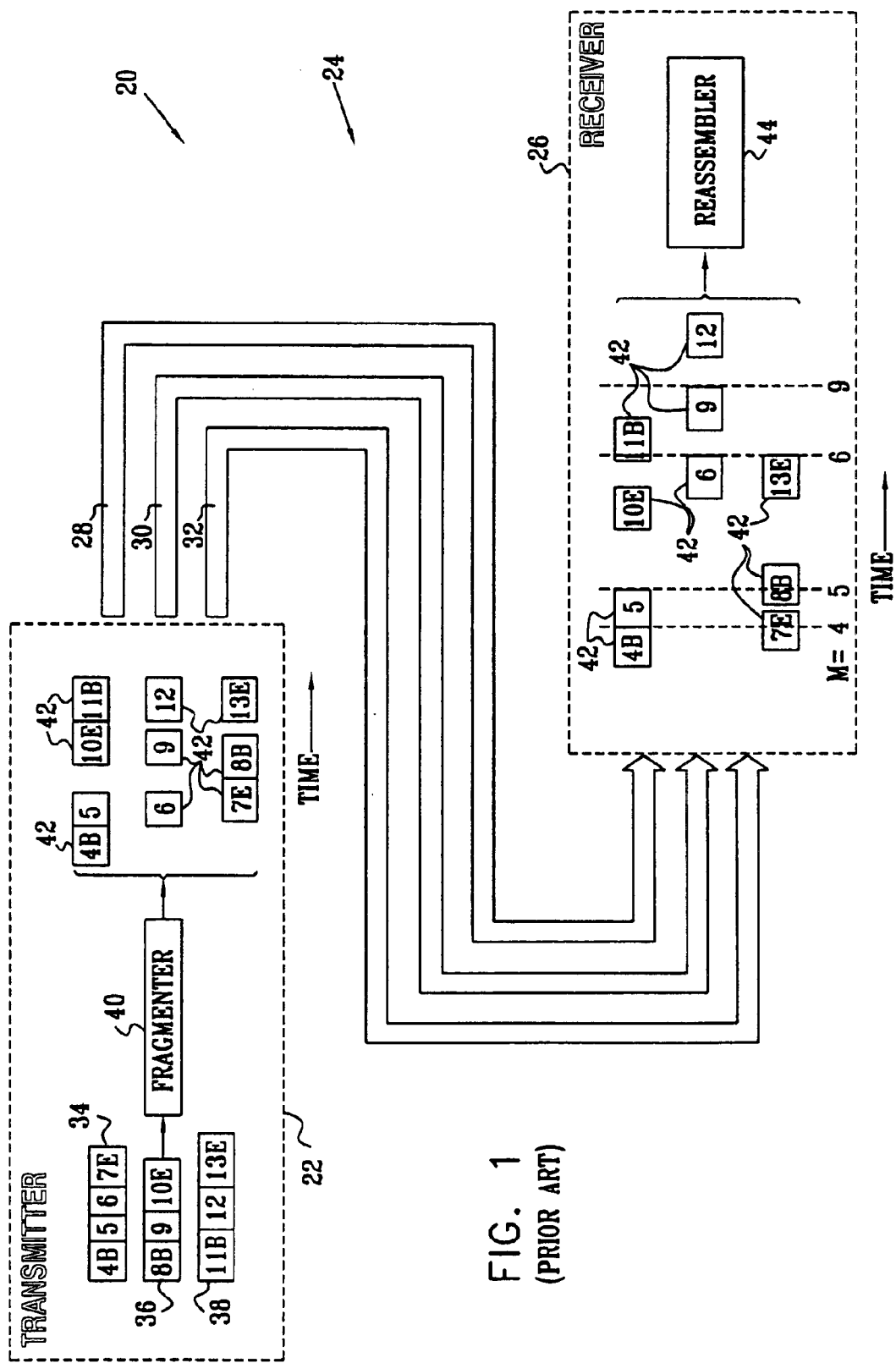
FIG. 1 is a block diagram that schematically illustrates a system for multilink data communications, as is known in the art.
Figure 2:
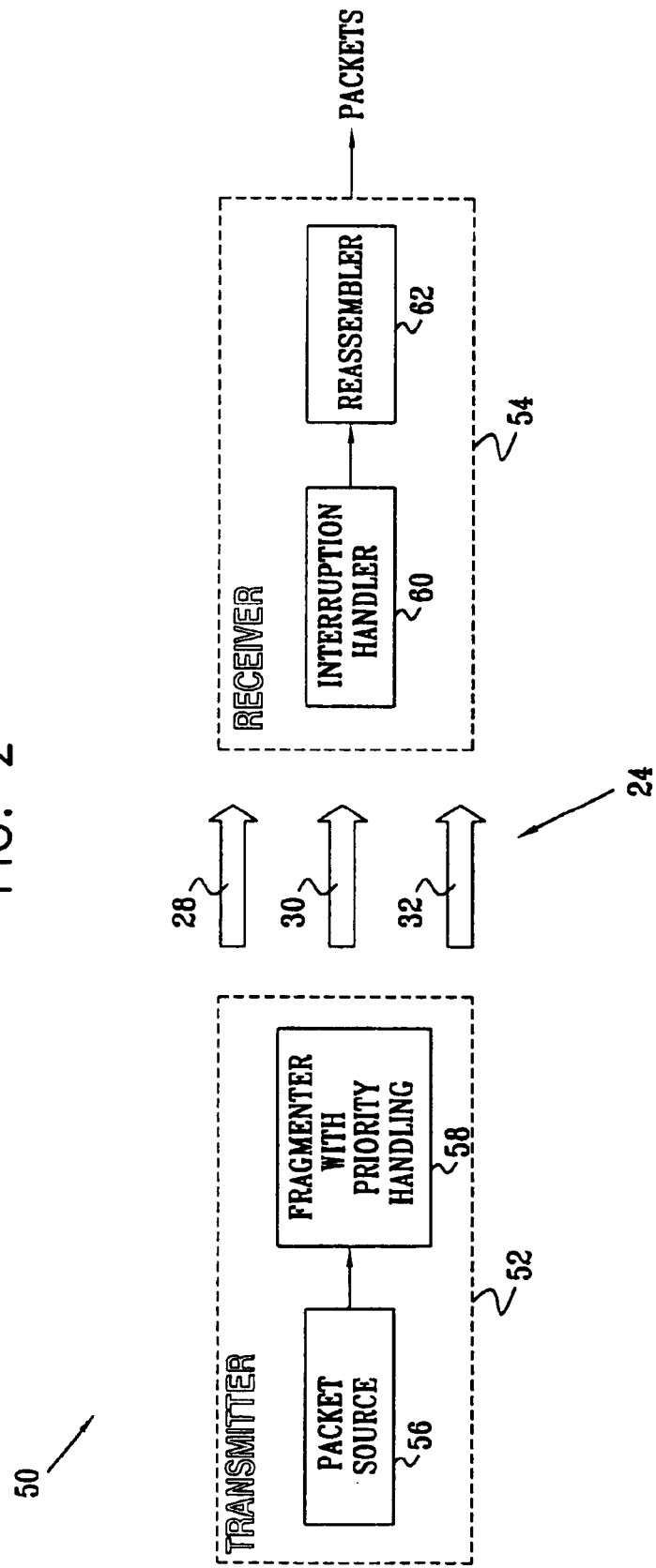
FIG. 2 is a block diagram that schematically illustrates a system for multilink data communications, in accordance with a preferred embodiment of the present invention.

Reference is now made to FIG. 2, which is a block diagram that schematically illustrates a system 50 for data transmission over multilink channel 24, in accordance with a preferred embodiment of the present invention. System 50 comprises a transmitter 52 and a receiver 54. The transmitter comprises a packet source 56 and a dynamic fragmenter 58 with priority handling capability. Fragmenter 58 divides input packets into fragments for transmission, in a manner substantially similar to the operation of fragmenter 40, shown in FIG. 1. In distinction to the operation of transmitter 22, however, fragmenter 58 is able to determine "on the fly" whether and how to fragment a given packet. It uses this capability to arrange the order of transmission of the fragments according to the priority levels of the packets, as described hereinbelow. Receiver 54 comprises an interruption handler 60 and a reassembler 62, which restore the fragments to their proper order and rebuild the transmitted packets from the fragments.

The particular functional blocks that are shown in FIG. 2 as elements of transmitter 52 and receiver 54 are selected for inclusion here for the sake of conceptual clarity. They represent only a small part of the functionality of such a transmitter and receiver in actuality. The integration of these fragmentation and reassembly functions in actual transmitters and receivers will be apparent to persons of skill in the art. By the same token, such persons will appreciate that the functions of fragmenter 58 may be carried out together by a CPU or other processor in the transmitter. Similarly, the functions of interruption handler 60 and reassembler 62 may be carried out by a CPU or other processor in the receiver. These CPUs or processors typically perform other functions, as well, as are known in the art.

Fragmenter 58 generates fragments of packets with different transmission priority levels. For example, one packet may be a voice packet with high priority, while another may be a portion of an electronic mail (e-mail) message with low priority. If the priority handler begins to receive fragments of a high-priority packet from fragmenter 58 while in the midst of transmitting a low-priority packet, it preferably interrupts the transmission of the low-priority fragments in order to send the high-priority ones. In order to enable receiver 54 to reassemble the fragments in the proper order and detect any lost fragments, the fragmenter adds a header to each fragment containing the following fields:

Sequence number (SN)—A running index, as in the MP header specified by the PPP Multilink Protocol.

Offset (O)—The sequential number of each fragment within a given packet. For the beginning fragment in the packet, O is zero (and the B bit specified by the Multilink Protocol is thus not needed).

Ending (E)—Set to E=1 for the last fragment in each packet, as specified by the Multilink Protocol.

Interruption level (I)—The number of lower-priority packets that a higher-priority packet has interrupted. The range of values of this field is given by the number of different priority levels supported by fragmenter 58. All fragments of a given packet must have the same interruption level.

Table I below presents an example of a sequence of packets transmitted in system 50, illustrating the meaning and use of the fragment header fields. The sequence consists of six packets, labeled A through F, having different (arbitrary) priority levels. Packets A, B, C and F are each divided into two fragments. Packet D is divided into three fragments, while packet E is sent as a single fragment. As seen below, the transmission of packet A is interrupted by packet B and then packet C; packet C is interrupted by packet D; and packet D is interrupted by packet E, giving three different nesting levels. Packet C does not interrupt packet B, since both have the same priority. Packet F arrives after transmission of packet A is finished.

TABLE I

| Packet | Priority | SN | Offset | Ending | Int. level |
|--------|----------|----|--------|--------|------------|
| A | 0 | 0 | 0 | 0 | 0 |
| B | I | 1 | 0 | 0 | 1 |
| B | I | 2 | 1 | 1 | 1 |
| C | I | 3 | 0 | 0 | 1 |
| D | IV | 4 | 0 | 0 | 2 |
| D | IV | 5 | 1 | 0 | 2 |
| E | VII | 6 | 0 | 1 | 3 |
| D | IV | 7 | 2 | 1 | 2 |
| C | I | 8 | 1 | 1 | 1 |
| A | 0 | 9 | 1 | 1 | 0 |
| F | VI | 10 | 0 | 0 | 0 |
| F | VI | 11 | 1 | 1 | 0 |

In a relatively simple embodiment of the present invention, when a low-priority packet is interrupted by a higher-priority packet, no further fragments of the low-priority packet are transmitted until transmission of the higher-priority packet is completed. On the other hand, in a more flexible embodiment, fragmenter 58 may continue transmitting fragments of the low-priority packet if there is time available while waiting for packet source 56 to supply the remainder of the higher-priority packet. In this latter embodiment, referring to the example of packets A and B in the table above, it might be possible to transmit fragment A(1) (the second fragment of packet A) before fragment B(1) if there is a sufficient gap in time between fragments B(0) and B(1). In the simpler embodiment, however, only the fragment order given in the table is possible.

Figure 3:
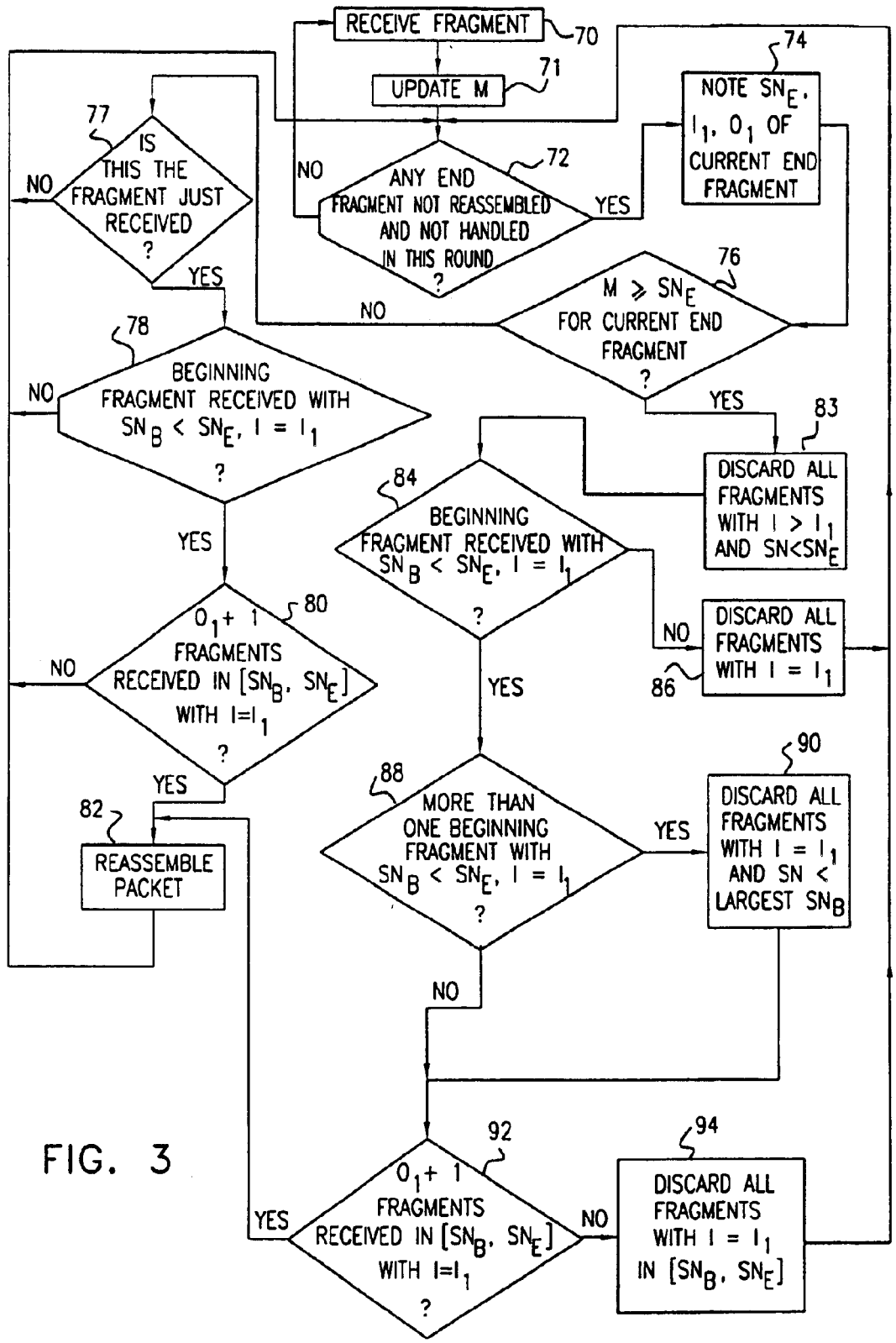
FIG. 3 is a flow chart that schematically illustrates a method for reassembling packet fragments received over a communication channel, in accordance with a preferred embodiment of the present invention.

FIG. 3 is a flow chart that schematically illustrates a method for packet reassembly, carried out by interruption handler 60 and reassembler 62, in accordance with a preferred embodiment of the present invention. Each cycle of the method begins when receiver 54 receives a new fragment, at a fragment reception step 70. The minimum value, M, of the SN of the received fragments is updated as appropriate, at an update step 71, in substantially the same manner as is called for by the PPP Multilink Protocol, and which is described in the Background of the Invention.

The interruption handler then checks to determine whether receiver 54 has received any ending fragments that have not yet been reassembled into a packet, at an ending step 72. If so, the interruption handler cycles through all of these unreassembled ending fragments in turn. For each of the ending fragments detected, its sequence number ($SN_E$), interruption level ($I_1$) and offset ($O_1$) are recorded as current ending fragment values, at an end processing step 74, for use in processing other, non-ending fragments that have been received, as described below. The current value of $SN_E$ for each of these ending fragments is checked against the current value of M, at a fragment loss detection step 76. If M is less than $SN_E$, the current ending fragment is checked to determine whether it is the fragment most recently received by receiver 74, at a new fragment detection step 77.

If so, normal packet reassembly continues, at a normal beginning fragment check step 78. Otherwise, if the current ending fragment is not the most recently received fragment, the process continues to cycle through any other ending fragments at step 72 until it is done. After all of the unreassembled ending fragments have been checked, the process returns to receive the next fragment at step 70.

At step 78, interruption handler 60 next checks the other fragments that have been received but not yet reassembled into packets to determine, for the current ending fragment, whether a beginning fragment has been received with the same interruption level, $I_1$, as the ending fragment and with a sequence number $SN_B$ that is less than $SN_E$ of the ending packet. If no such beginning fragment is found, the interruption handler concludes that the beginning fragment for the current ending fragment has not yet been received and returns to step 72 to check any further ending fragments. If an appropriate beginning fragment has been received, however, the interruption handler then checks the number of fragments with interruption level $I_1$ that have been received in the range between $SN_B$ and $SN_E$, at a complete packet checking step 80. When the complete packet has reached the receiver, there should be exactly $O_1+1$ such fragments, wherein $O_1$ is the offset of the current ending fragment, as noted above. Again, if not all of the expected fragments have been received, the process returns to step 72. Otherwise, once all of the $O_1+1$ packets have arrived, they are passed to reassembler 62 for rebuilding of the packet, at a reassembly step 82.

On the other hand, when the interruption handler finds at step 76 that $M \geq SN_E$, it may be necessary to discard fragments. In the "simple embodiment" described above (in which all fragments at any higher interruption level must be transmitted before transmission at a lower interruption level can continue), any outstanding fragments for which $I > I_1$ and $SN < SN_E$ are discarded, at an optional higher level discard step 83. These fragments are discarded because in this embodiment, whenever it is found that $M \geq SN_E$ for a given interruption level $I_1$, it necessarily means that fragments have also been lost from any higher-priority packets that were transmitted before the current ending packet and have not yet been reassembled. On the other hand, in the "flexible embodiment," in which the transmitter may alternate between sending fragments with higher and lower interruption levels, this additional discard of fragments with higher interruption levels is not carried out.

Next, at step 84, the interruption handler determines whether a beginning fragment has been received belonging to the same packet as the current ending fragment. In other words, the interruption handler determines whether a beginning packet has been received with interruption level $I_1$ and with a sequence number $SN_B$ that is less than $SN_E$. If no such beginning fragment is found, then all fragments that have been received with interruption level $I_1$ are discarded, at a packet discard step 86.

It may also occur that two or more beginning fragments have been received that satisfy the criteria of step 84. In this case, the interruption handler checks to determine which of the beginning fragments has the largest sequence number $SN_B$, at a beginning fragment selection step 88. This beginning fragment, whose SN is thus closest to the sequence number $SN_E$ of the current ending fragment, is chosen for use in reassembly of the packet. Any fragments having interruption level $I_1$ and sequence number SN that is less than the largest $SN_B$ found at level $I_1$ cannot belong to the current packet, and are therefore discarded, at an excess fragment discard step 90.

After the appropriate beginning packet has been found, the interruption handler finally checks the number of fragments with interruption level $I_1$ that have been received in the range between $SN_B$ and $SN_E$, at a complete packet checking step 92. As noted above at step 80, there should be exactly $O_1+1$ such fragments. If not all of the expected fragments have been received, the interruption handler concludes that one or more fragments have been lost. All of the packets at interruption level $I_1$ that have sequence numbers between $SN_B$ and $SN_E$ are then discarded, at a final discard step 94. Otherwise, if all of the $O_1+1$ packets have arrived, they are passed for processing to reassembly step 82.

In reassembling the transmitted packets, reassembler 62 can order the fragments according to either the sequence number SN or the offset O. These two fields provide a redundant count, and the reassembler preferably checks them one against the other to ensure data consistency. Alternatively, to reduce the data volume that must be transmitted, the offset field can be eliminated from all fragments but the ending fragment. In this case, the B bit (eliminated from the scheme described hereinabove) should be used to distinguish the beginning fragment from subsequent ones.

Although preferred embodiments are described herein for the most part with reference to transmission of data packets in IP networks, the principles of the present invention are likewise applicable to networks and datagrams of other types, including transmission of cells in ATM networks. Furthermore, while these preferred embodiments relate specifically to packet fragmentation for the sake of multilink transmission, the present invention may be applied more generally to fragmentation and reassembly of datagrams transmitted over other sorts of packet-switched networks and links.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for transmitting data over a channel, comprising:

receiving a first datagram for transmission at a first priority;

receiving a second datagram for transmission at a second priority, higher than the first priority, before the transmission of the first datagram is completed;

responsive to receiving the second datagram, deciding to divide the first datagram into a plurality of fragments, including a first fragment and a last fragment;

transmitting the fragments of the first datagram over the channel, beginning with the first fragment; and transmitting at least a fragment of the second datagram over the channel before transmitting the last fragment of the first datagram, wherein transmitting at least the fragment of the second datagram comprises interrupting transmission of a number of datagrams, including at least the first datagram, in order to transmit at least the fragment of the second datagram, and adding a field to the fragment indicating the number of datagrams whose transmission has been interrupted.

2. A method according to claim 1, wherein receiving the first and second datagrams comprises receiving Internet Protocol (IP) packets.

3. A method according to claim 1, wherein transmitting the fragments comprises distributing the fragments for transmission over a plurality of parallel physical links.

4. A method according to claim 3, wherein the plurality of parallel physical links are arranged so as to constitute a single logical channel.

5. A method according to claim 3, and comprising receiving the fragments of the first and second datagrams at a receiver connected to the plurality of parallel physical links, and reassembling the datagrams from the fragments at the receiver.

6. A method according to claim 5, wherein transmitting the fragments comprises adding an indication to the fragments that transmission of the fragments of the first datagram was interrupted by transmission of the second datagram, and wherein reassembling the datagrams comprises reassembling the packets responsive to the indication.

7. A method according to claim 6, wherein reassembling the datagrams comprises detecting loss of a fragment of one of the datagrams on one of the links, and discarding other fragments received at the receiver responsive to the indication.

8. A method according to claim 1, wherein transmitting at least the fragment of the second datagram comprises dividing the second datagram into multiple fragments for transmission over the channel.

9. A method according to claim 8, wherein transmitting at least the fragment of the second datagram comprises interrupting transmission of the fragments of the first datagram until all fragments of the second datagram have been transmitted over the channel.

10. A method according to claim 8, wherein transmitting at least the fragment of the second datagram comprises interspersing transmission of the fragments of the first datagram with one or more fragments of the second datagram, subject to the first and second priorities.

11. A method according to claim 8, wherein the multiple fragments of the second diagram comprise first and last fragments, and wherein the method comprises:

receiving a third datagram for transmission at a third priority, higher than the second priority, before the last fragment of the second datagram has been transmitted; and transmitting at least a fragment of the third datagram over the channel before transmitting the last fragment of the second datagram.

12. A method according to claim 11, wherein transmitting the at least one fragment of the third datagram comprises transmitting the at least one fragment of the third datagram before transmitting the last fragment of the first datagram.

13. A method according to claim 1, and comprising receiving the fragments of the first and second datagrams at a receiver connected to the channel, and reassembling the datagrams from the fragments responsive to the field indicating the number.

14. A method according to claim 13, wherein reassembling the datagrams comprises detecting loss of a fragment having a given value of the number indicated by the field, and discarding other fragments received at the receiver with the given value of the number indicated by the field.

15. Apparatus for transmitting data over a channel, comprising:

a transmitter, coupled to receive first and second datagrams for transmission over the channel at respective first and second priorities, wherein the second priority is higher than the first priority, and the transmitter receives the second packet before the transmission of the first packet is completed, and adapted, responsive to receiving the second packet, to decide to divide the first datagram into a plurality of fragments, including a first fragment and a last fragment, and to transmit the fragments of the first datagram over the channel, beginning with the first fragment, and to transmit at least a fragment of the second datagram over the channel before transmitting the last fragment of the first datagram, wherein the transmitter is adapted to interrupt transmission of a number of datagrams, including at least the first datagram, in order to transmit at least the fragment of the second datagram, and to add a field to the fragment indicating the number of datagrams whose transmission has been interrupted; and a receiver, adapted to receive the fragments of the datagrams over the channel and to reassemble the fragments so as to reconstruct the first and second datagrams.

16. Apparatus according to claim 15, wherein the datagrams comprise Internet Protocol (IP) packets.

17. Apparatus according to claim 15, wherein the channel comprises a plurality of parallel physical links, and wherein the transmitter is adapted to distribute the fragments for transmission over the plurality of physical links, and the receiver is coupled to the plurality of physical links so as to receive the fragments thereon.

18. Apparatus according to claim 17, wherein the plurality of parallel physical links are arranged so as to constitute a single logical channel.

19. Apparatus according to claim 17, wherein the transmitter is adapted to add an indication to the fragments that transmission of the fragments of the first datagram was interrupted by transmission of the second datagram, and the receiver is adapted to reassemble the packets responsive to the indication.

20. Apparatus according to claim 19, wherein the receiver is adapted to detect a loss of a fragment of one of the datagrams on one of the links, and to discard other fragments that it receives responsive to the indication.

21. Apparatus according to claim 15, wherein the transmitter is adapted to divide the second datagram into multiple fragments for transmission over the channel.

22. Apparatus according to claim 21, wherein the transmitter is configured to interrupt transmission of the fragments of the first datagram until it has transmitted all of the fragments of the second datagram over the channel.

23. Apparatus according to claim 21, wherein the transmitter is configured to intersperse transmission of the fragments of the first datagram with the fragments of the second datagram, subject to the first and second priorities.

24. Apparatus according to claim 21, wherein the multiple fragments of the second diagram comprise first and last fragments, and wherein the transmitter is further adapted to receive a third datagram for transmission at a third priority, higher than the second priority, before the last fragment of the second datagram has been transmitted, and to transmit at least a fragment of the third datagram over the channel before transmitting the last fragment of the second datagram.

25. Apparatus according to claim 24, wherein the transmitter is adapted to transmit at least the fragment of the third datagram before transmitting the last fragment of the first datagram.

26. Apparatus according to claim 15, wherein the receiver is adapted to reassemble the datagrams from the fragments responsive to the field indicating the number.

27. Apparatus according to claim 26, wherein the receiver is adapted to detect loss of a fragment having a given value of the number indicated by the field, and to discard other fragments with the given value of the number indicated by the field.

* * * * *